United States Patent
Johansson et al.

(10) Patent No.: US 10,548,049 B2
(45) Date of Patent: Jan. 28, 2020

(54) EXTENDING TIMERS FOR EXTENDED COVERAGE

(71) Applicant: Telefonaktiebolaget LM Ericsson (publ), Stockholm (SE)

(72) Inventors: Nicklas Johansson, Brokind (SE); Jens Bergqvist, Linköping (SE); John Walter Diachina, Garner, NC (US); Björn Hofström, Linköping (SE); Olof Liberg, Stockholm (SE); Claes-Göran Persson, Mjölby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/771,951

(22) PCT Filed: Oct. 13, 2016

(86) PCT No.: PCT/SE2016/050987
§ 371 (c)(1),
(2) Date: Apr. 27, 2018

(87) PCT Pub. No.: WO2017/074240
PCT Pub. Date: May 4, 2017

(65) Prior Publication Data
US 2018/0352472 A1 Dec. 6, 2018

Related U.S. Application Data

(60) Provisional application No. 62/247,824, filed on Oct. 29, 2015.

(51) Int. Cl.
*H04W 28/04* (2009.01)
*H04L 1/08* (2006.01)
(Continued)

(52) U.S. Cl.
CPC ............ *H04W 28/04* (2013.01); *H04L 1/08* (2013.01); *H04L 1/188* (2013.01); *H04L 1/1812* (2013.01); *H04W 4/70* (2018.02)

(58) Field of Classification Search
None
See application file for complete search history.

(56) References Cited

U.S. PATENT DOCUMENTS 5,835,723 A * 11/1998 Andrews ................ G06F 9/542
 709/226
7,599,398 B1 * 10/2009 Shang ................ H04W 56/006
 370/503
(Continued)

FOREIGN PATENT DOCUMENTS

WO WO-2012042454 A1 * 4/2012 ........... H04L 1/1854
WO WO-2014126324 A1 * 8/2014 ........ H04W 74/0808
(Continued)

OTHER PUBLICATIONS

3GPP, "3rd Generation Partnership Project; Technical Specification Group Core Network and Terminals; Mobile radio interface Layer 3 specification; Core network protocols; Stage 3 (Release 13)", 3GPP TS 24.008 V13.3.0, Sep. 2015, 1-727.
(Continued)

*Primary Examiner* — Robert M Morlan
(74) *Attorney, Agent, or Firm* — Murphy, Bilak & Homiller, PLLC

(57) ABSTRACT

A method performed by a communication device for determining an extended time period related to a signalling message between a core network node and the communication device in a wireless communications network, the method comprising: obtaining (301) an indication of a coverage capability of the communication device; obtaining (302) an indication of a time period, which time period is related to the signalling message; and determining (303) the
(Continued)

extended time period related to the signalling message, based on the indication of the coverage capability of the communication device and based on the indication of the time period.

11 Claims, 7 Drawing Sheets

(51) Int. Cl.
*H04L 1/18* (2006.01)
*H04W 4/70* (2018.01)

(56) References Cited

U.S. PATENT DOCUMENTS

| | | | |
|---|---|---|---|
| 2007/0025388 A1 | 2/2007 | Abhishek et al. | |
| 2016/0262118 A1* | 9/2016 | Kim | H04W 52/365 |
| 2018/0184246 A1* | 6/2018 | Ryu | H04W 8/02 |

FOREIGN PATENT DOCUMENTS

| | | | | |
|---|---|---|---|---|
| WO | WO-2015171984 A1 | * | 11/2015 | H04W 76/38 |
| WO | WO-2016148752 A1 | * | 9/2016 | H04W 8/20 |
| WO | WO-2016208997 A1 | * | 12/2016 | H04W 8/02 |
| WO | WO-2017024005 A1 | * | 2/2017 | H04W 4/70 |
| WO | WO-2017136843 A1 | * | 8/2017 | H04W 76/27 |

OTHER PUBLICATIONS

3GPP, "3rd Generation Partnership Project; Technical Specification Group Core Network and Terminals; Non-Access-Stratum (NAS) protocol for Evolved Packet System (EPS); Stage 3 (Release 13)", 3GPP TS 24.301 V13.3.0, Sep. 2015, 1-394.

Unknown, Author, "Email discussion report on [91#24][LTE/MTC] Timer handling for extended coverage", 3GPP TSG-RAN WG2 #91 bis, Tdoc R2-154870, Malmo, Sweden, Oct. 5-9, 2015, 1-27.

Unknown, Author, "New Work Item on Extended Coverage GSM (EC-GSM) for support of Cellular Internet of Things", 3GPP TSG GERAN#67, GP-151039, Yinchuan, P.R. China, Aug. 10-14, 2015, 1-7.

\* cited by examiner

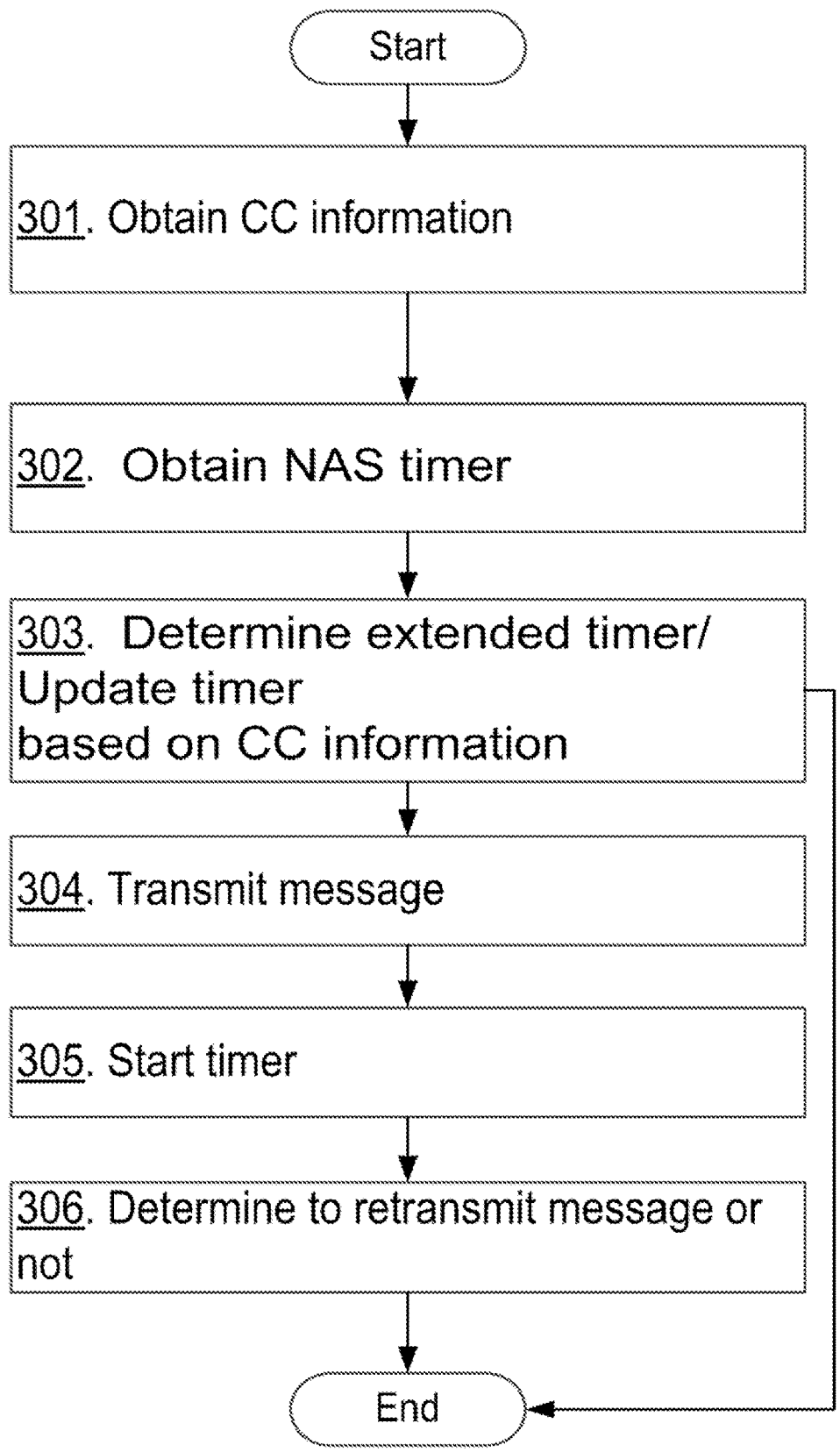
Fig. 3 Method in communication device 140

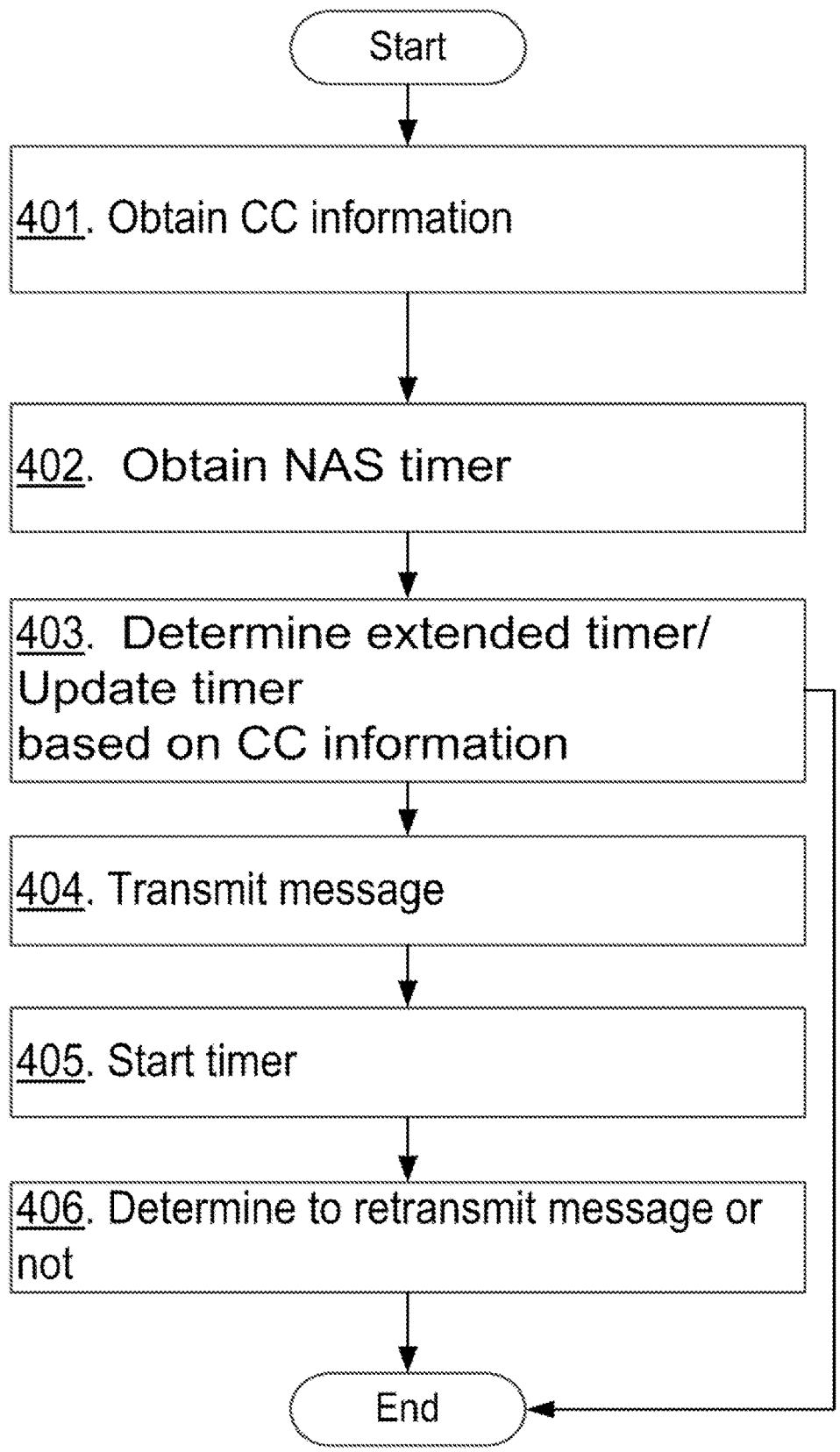
Fig. 4a Method in core network node 115

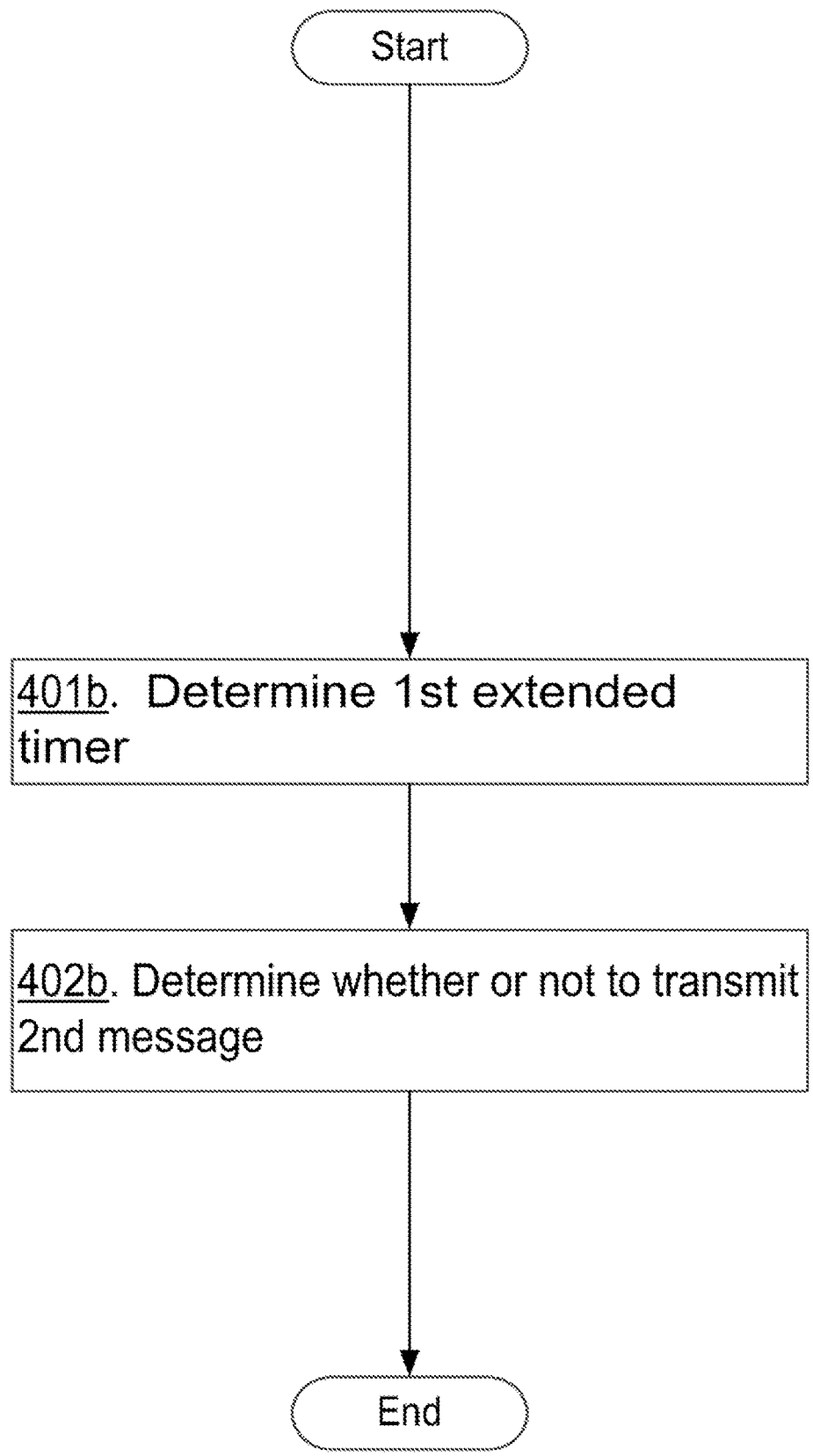
Fig. 4b Method in core network node 115

EXTENDING TIMERS FOR EXTENDED COVERAGE

TECHNICAL FIELD

Embodiments herein relate to a communication device, a network node and methods therein for handling extended coverage.

BACKGROUND

In a typical radio communications network, communication devices, also known as Mobile Stations (MSs) and/or user equipments (UEs), communicate via a Radio Access Network (RAN) to one or more Core Networks (CN). The radio access network covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System (UMTS) is a third generation mobile communication system, which evolved from the second generation (2G) Global System for Mobile Communications (GSM).

General Packet Radio Service (GPRS) is a packet oriented mobile data service on the 2G and 3G cellular communication system's global system for mobile communications (GSM).

Enhanced Data rates for GSM Evolution (EDGE) also known as Enhanced GPRS (EGPRS), or IMT Single Carrier (IMT-SC), or Enhanced Data rates for Global Evolution is a digital mobile phone technology that allows improved data transmission rates as a backward-compatible extension of GSM.

The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity.

The project covers cellular telecommunications network technologies, including radio access, the core transport network, and service capabilities—including work on codecs, security, quality of service—and thus provides complete system specifications. The specifications also provide hooks for non-radio access to the core network, and for interworking with W-Fi networks.

In some versions of the RAN as e.g. in UMTS or GSM, several base stations may be connected, e.g., by landlines or microwave, to a controller node, such as a radio network controller (RNC) or a base station controller (BSC), which supervises and coordinates various activities of the plural base stations connected thereto. The RNCs and BSCs are typically connected to one or more core networks.

Specifications for Evolved Packet System (EPS) have been completed within the 3rd Generation Partnership Project (3GPP) and are further evolved in coming 3GPP releases. The EPS comprises the Evolved Universal Terrestrial Radio Access Network (E-UTRAN), also known as the LTE radio access, and the Evolved Packet Core (EPC), also known as System Architecture Evolution (SAE) core network. E-UTRAN/LTE is a variant of a 3GPP radio access technology wherein radio base station nodes are directly connected to the EPC network, i.e. a radio network controller concept as realized in UMTS with a Radio Network Controller (RNC) does not exist. In general, in EPS the functions of an RNC are distributed between eNBs and the core network. As such, the RAN of an EPS has an essentially "flat" architecture comprising radio base stations without being controlled by RNCs.

Machine Type Communications (MTC) is an area within telecommunications, sometimes also referred to as M2M or Internet of Things (IoT), in which it is envisioned that all types of devices which may potentially benefit from communicating will do so. That is, everything from agriculture and/or industrial sensors and actuators to things in the smart home or workout gauges in the personal networks will be connected wirelessly.

MTC has in recent years shown to be a growing market segment for cellular technologies, especially for GSM and Enhanced Data Rates for GSM Evolution (EDGE) with its global coverage, ubiquitous connectivity and price competitive devices.

With more and more diverse MTC applications, more and more diverse set of MTC requirements arise. Among these there is a low-end market segment characterized by some or all of the following requirements compared with the current GSM technology:

Extended radio coverage
Long battery life
Low device complexity
Large number of connected devices Today's cellular systems are not always suitable for new applications and devices that follow with MTC and Internet of Things (IoT). For example, there is an objective to increase a radio coverage compared to existing services. In the following, the use of the word coverage will refer to radio coverage. In telecommunications, the coverage of a base station is the geographic area where the base station is able to communicate with wireless devices. Some MTC networks are envisioned to be deployed in extreme coverage circumstances, such as basements of buildings or beneath the ground where radio signals suffer from severe attenuation.

At a 3GPP meeting GERAN#67 a new work item called 'New Work Item on Extended Coverage GSM (EC-GSM) for support of Cellular Internet of Things' was approved with the intention to improve coverage with 20 dB, to improve battery life time and to decrease device complexity. Later the name EC-GSM was changed to Extended-Coverage Global System for Mobile communications Internet of Things (EC-GSM-IoT), and these two names will be used interchangeably hereafter.

Cellular Internet of Things' provides IoT by means of a cellular system, such as EC-GSM-IoT.

An extended coverage, e.g. a coverage range beyond that of legacy GPRS/EGPRS operation may be achieved by blind physical layer repetitions in both uplink and downlink. The number of repetitions may be associated to a given Coverage Class (CC).

Logical channels supporting operation in extended coverage are referred to as Extended Coverage channels (EC-channels). On a control channel, i.e. on an EC control channel, the coverage may be improved using blind physical layer repetitions of radio blocks while on a data channel, i.e. on an EC data channel, the coverage may be improved using a combination of blind physical layer repetitions and HARQ retransmissions of radio blocks. "Blind Physical Layer Repetitions" means that a predetermined number of repetitions are sent blindly, i.e. without feedback from the receiving end.

Taking the example of EC-GSM four different Coverage Classes are defined denoted as CC1, CC2, CC3 and CC4 respectively. Each Coverage Class is approximated with a level of extended coverage range compared to legacy GPRS/EGPRS operation. I.e. each Coverage Class represents a certain amount of degradation of a signal over noise ratio compared to legacy GPRS/EGPRS operation, e.g. 3 dB, such that the number of blind physical layer repetitions associated with each Coverage Class is proportional to its corresponding degradation compared to legacy GPRS/EGPRS operation. For example, for the EC Packet Data Traffic CHannel (EC-PDTCH) CC1 corresponds to one single transmission, CC2 corresponds to 4 transmissions, i.e. 3 repetitions, CC3 corresponds to 8 transmissions and CC4 corresponds to 16 transmissions. Thus, CC1 corresponds to the coverage range of legacy GPRS/EGPRS operation, i.e. extended coverage not used.

Further, in EC-GSM-IoT a fixed predefined number of blind physical layer repetitions are applied per logical channel. The number of blind physical layer repetitions may differ between logical channels for the same Coverage Class.

The approach of blind physical layer repetitions on the EC-channels will result in a decrease in the data rates and thus longer latencies compared to the legacy GPRS/EGPRS operation for sending and receiving messages between the network, such as the core network, and the mobile stations. Non Access Stratum (NAS) messages are messages that are sent transparently via the radio access network between the mobile station and the core network, e.g. a Serving GPRS Support Node (SGSN). The NAS messages are supervised by timers defined in 3GPP TS 24.008 v13.3.0 Technical Specification Group Core Network and Terminals; Mobile radio interface Layer 3 specification; Core network protocols; Stage 3.

When e.g. a mobile station enters a cell which belongs to a new Routing Area (RA), an RA Updating (RAU) procedure is started by the mobile station, whereby the mobile station sends a ROUTING AREA UPDATE REQUEST message to the SGSN and starts a NAS timer T3330. The timer has a defined value of 15 seconds in 3GPP TS 24.008 V13.3.0, and is normally stopped at reception of the ROUTING AREA UPDATE ACCEPT message or at reception of the ROUTING AREA UPDATE REJECT message sent from SGSN. At expiry of T3330, i.e. when neither ROUTING AREA UPDATE ACCEPT nor ROUTING AREA UPDATE REJECT message has been received, the procedure is started again, at most four times. At the fifth expiry of timer T3330, the mobile station shall abort the procedure.

During the RA updating procedure the SGSN may trigger the authentication and ciphering procedure whereby the SGSN sends the AUTHENTICATION AND CIPHERING REQUEST message to the mobile station and starts a NAS timer T3360. The timer has a defined value of 6 seconds in 3GPP TS 24.008 V13.3.0, and is normally stopped at reception of the AUTHENTICATION AND CIPHERING RESPONSE message or at reception of the AUTHENTICATION AND CIPHERING FAILURE message sent from the mobile station. At expiry of T3360, i.e. when neither AUTHENTICATION AND CIPHERING RESPONSE nor AUTHENTICATION AND CIPHERING FAILURE message has been received, the AUTHENTICATION AND CIPHERING REQUEST message is retransmitted again and the T3360 timer is reset and restarted, at most four times. At the fifth expiry of timer T3360, the SGSN aborts the procedure.

The mobile station will have to restart the RAU procedure after each timeout. This implies that more power will be consumed by the mobile station which is a problem for battery limited devices. This is particularly a problem for mobile station operating in extended coverage, for example due to the requirement of long battery lifetime.

If the mobile station has tried the RAU procedure the maximum number of times allowed and failed each time, then the mobile station goes out of service, potentially for long time periods.

SUMMARY

Since the timeout values for the mobile station timer T3330 and the network timer T3360 are defined for a mobile station operating in a legacy GPRS/EGPRS network, it is likely the timers will expire for a mobile station operating in extended coverage, i.e. an mobile station that is subject to a longer delay in the signalling over the radio interface. As the signalling latency increases with the Coverage Class of the mobile station due to the increased number of blind physical layer repetitions with higher Coverage Classes, the risk for a mobile station timeout or a network timeout increases.

The procedures and timers described herein are just examples. There are other procedures and timers defined in 3GPP TS 24.008 V13.3.0 affected by the signalling latency due to mobile stations operating in extended coverage. One example is the Authentication procedure wherein the AUTHENTICATION REQUEST message is sent across the radio interface to the mobile station and the network starts a timer T3260.

As the values of these network and mobile station initiated NAS timers are defined for mobile stations in legacy GPRS/EGPRS operation, they need to be extended for mobile stations operating in extended coverage, i.e. for mobile stations that are subject to longer signalling delays due to message transmissions over the radio interface having longer latency.

The need for coverage extension mechanisms, i.e. the Coverage Class, may be different in the uplink and the downlink directions for a specific mobile station, e.g. due to difference in power levels that are used in the two directions. As an example, different mobile stations may be supporting different levels of output power in the uplink, thus leading to different coverage at the same position. That means that they may need to use different Coverage Classes at the same position. For example, one mobile station has CC2 and the other has CC3. However, for the DL there may be no difference between the two mobile stations and both mobile stations may thus e.g. need to use CC2 in the DL.

An object of embodiments herein is to improve the performance of one or more wireless communications networks comprising network nodes and of a communications device by obviating at least some of the above mentioned problems. It may be an object of embodiments herein to reduce the risk for failures due to expired time periods in extended coverage of the communication device.

According to a first aspect of embodiments herein, the object is achieved by a method performed by a communication device for determining an extended time period related to a signalling message between a core network node and the communication device in a wireless communications network.

The communication device:
obtains an indication of a coverage capability of the communication device;
obtains an indication of a time period, which time period is related to the signalling message; and
determines the extended time period related to the signalling message, based on the indication of the coverage capability of the communication device and based on the indication of the time period.

According to a second aspect of embodiments herein, the object is achieved by a communications device configured to perform the method according to the first aspect.

That is, the communication device is configured to obtain an indication of a coverage capability of the communication device.

The communication device is further configured to obtain an indication of a time period, which time period is related to the signalling message.

The communication device is further configured to determine the extended time period related to the signalling message, based on the indication of the coverage capability of the communication device and based on the indication of the time period.

According to a third aspect of embodiments herein, the object is achieved by a method performed by a core network node for determining an extended time period related to a signalling message between the core network node and a communication device in a wireless communications network.

The core network node:
obtains an indication of a coverage capability of the communication device;
obtains an indication of a time period, which time period is related to the signalling message; and
determines the extended time period related to the signalling message, based on the indication of the coverage capability of the communication device and based on the indication of the time period.

According to a further aspect of embodiments herein, the object is achieved by a core network node configured to perform the method according to the third aspect.

That is, the core network node is configured to obtain an indication of a coverage capability of a communication device.

The core network node is further configured to obtain an indication of a time period, which time period is related to the signalling message.

The communication device is further configured to determine the extended time period related to the signalling message, based on the indication of the coverage capability of the communication device and based on the indication of the time period.

According to a further aspect of embodiments herein, the object is achieved by a computer program, comprising instructions which, when executed on at least one processor, causes the at least one processor to carry out the method performed by the communication device or the core network node.

Since the extended time period is determined based on the indication of the coverage capability of the communication device the risk for failures due to expired time periods is reduced in extended coverage of the communication device, while unnecessary delay of signalling is avoided in non-extended coverage.

BRIEF DESCRIPTION OF THE DRAWINGS

Examples of embodiments herein are described in more detail with reference to attached drawings in which:

FIG. 3 is a flowchart depicting embodiments of a method performed by a communication device.

FIG. 4a is a flowchart depicting embodiments of a method performed by a network node.

FIG. 4b is a flowchart depicting further embodiments of a method performed by the network node.

DETAILED DESCRIPTION

Figure 1:
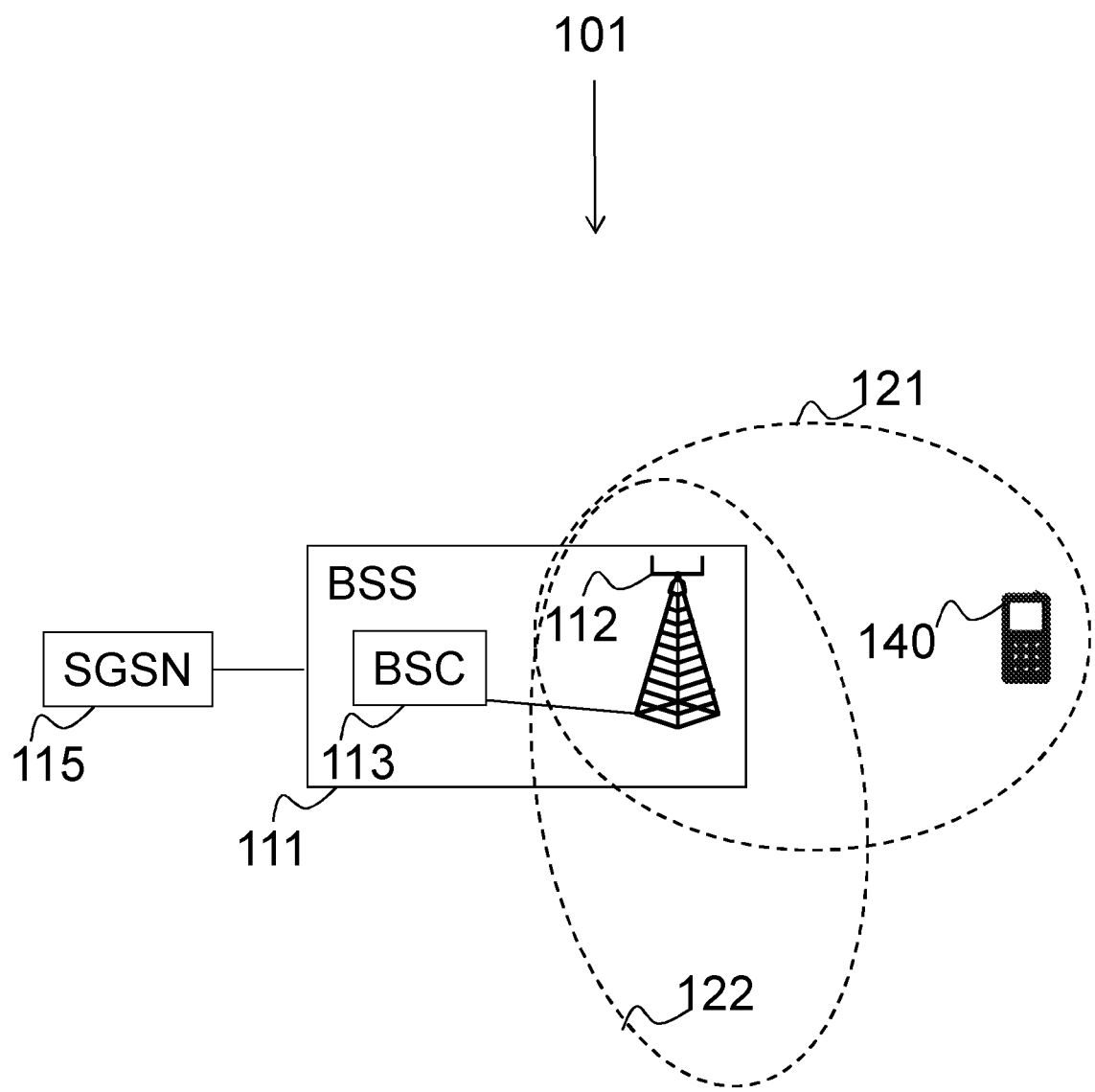
FIG. 1 is a schematic block diagram illustrating a communications network.

Embodiments herein may be implemented in one or more communications networks whereof FIG. 1 depicts parts of a communications network 101. The communications network 101 may be a telecommunications network or similar, such as a wireless communications network also known as a radio communications network. The communication network 101 may comprise one or more RAN and one or more CN.

The communications network 101 may operate according to a specific Radio Access Technology (RAT). The wireless communication network 101 is exemplified herein as a GSM network.

Even though GSM/EDGE will be used herein as examples of a RAT it may be possible to apply the embodiments described herein to other RATs. Such RATs may e.g. in particular be Narrow Band Internet of Things (NB-IoT), formerly known as Narrow Band LTE (NB-LTE) and NB Cellular system support for ultra-low complexity and low throughput Internet of Things NB-CIoT, as defined in 3GPP Technical Report 45.820 on Cellular system support for ultra-low complexity and low throughput Internet of Things (CIoT), chapter 7.3 and 7A. Other NAS protocols may be used such as the NAS protocol for Evolved Packet System described in 3GPP TS 24.301 v13.3.0, Technical Specification Group Core Network and Terminals; Non-Access-Stratum (NAS) protocol for Evolved Packet System (EPS); Stage 3.

In principle, the communication network 101 may use a number of other different technologies, such as Wi-Fi, Long Term Evolution (LTE), LTE-Advanced, Wideband Code Division Multiple Access (WCDMA), Worldwide Interoperability for Microwave Access (WiMax), or Ultra Mobile Broadband (UMB), just to mention a few possible implementations.

In the communications network 101, network nodes capable of communicating with communication devices operate. For example, a radio access network node 111 capable of communicating with communication devices operates in the communications network 101. The radio access network node 111 is configured to operate in the communications network 101.

In some embodiments the radio access network node 111 comprises several physical network nodes. For example, in some embodiments applicable to GSM the radio access network node 111 is a Base Station System (BSS) also referred to as a Base Station Subsystem (BSS). Then the radio access network node 111 may comprise a first radio access network node 112 and a second radio access network node 113. The first radio access network node 112 may be a Base Transceiver Station (BTS) and the second radio access network node 113 may be a Base Station Controller (BSC) or a Packet Control Unit (PCU). The first radio access network node 112 may also be referred to as a radio base station and e.g. a NodeB, an eNB, eNode B, Access Point Base Station, base station router, or any other network unit capable of communicating with communication devices.

In some other embodiments the radio access network node 111 is or comprises a radio access network node that communicates with the communication devices via another radio access network node. In this case the radio access network node 111 may for example be a Radio Network Controller (RNC) in an UMTS network. The RNC is not shown in FIG. 1.

FIG. 1 further illustrates coverage areas of the radio access network. A coverage area is a geographical area where radio coverage is provided by the radio access network, e.g. by the first radio access network node 111. E.g. the first radio access network node 112 provides radio coverage in a first coverage area 121, such as a first cell. In FIG. 1 the first radio access network node 112 further provides radio coverage in a second coverage area 122, such as a second cell.

A cell is a geographical area where radio coverage is provided by network node equipment such as WiFi AP equipment, base station equipment at a base station site or at remote locations in Remote Radio Units (RRU). The first radio access network node 112 is an example of such network node equipment.

FIG. 1 further illustrates a core network node 115, such as a SGSN, being responsible for the delivery of data packets from and to the mobile stations within its geographical service area. Its tasks comprise packet routing and transfer, mobility management, e.g. attach/detach and location management, logical link management, and authentication and charging functions. The location register of the core network node 115, such as the SGSN, stores location information, e.g., current cell, current Visitor Location Register (VLR), and user profiles, e.g., IMSI, address(es), used in the packet data network of all GPRS users registered with it.

The radio access network node 111 may communicate with communication devices, such as a communication device 140, e.g. in the cell 121 served by the first radio access network node 112.

The communication device 140, which also may be known as a mobile station, wireless device, a wireless communications device, a user equipment and/or a wireless terminal, is capable of communicating with the communications network 101.

There may of course be more than one communications device that communicates with the wireless communications networks.

It should be understood by the person skilled in the art that "communication device" is a non-limiting term and it refers to any type of device communicating with a radio network node, such as a radio access network node, in a cellular or mobile communication system.

The communication device 140 may e.g. be a mobile terminal, a mobile phone, a computer such as e.g. a laptop, a Personal Digital Assistant (PDA) or a tablet computer, sometimes referred to as a surf plate, with wireless capability, or any other radio network unit capable to communicate over a radio link in a wireless communications network.

Further examples of the communication device 140 may be Machine Communication (MTC) device, Machine to Machine (M2M) device, a Device to Device (D2D) terminal, or node, target device, device to device UE, MTC UE or UE capable of machine to machine communication, iPAD, tablet, smart phone, Laptop Embedded equipment (LEE), Laptop Mounted Equipment (LME), USB dongles, sensor, relay, mobile tablets or even a small base station.

Embodiments herein present a method which may be implemented in the communication device 140 and in the core network node 115. An SGSN is used as an example of the core network node 115 in the following, but generally it may be another network node serving the communication device 140 as well. For example, for NB-IoT the applicable network node may also be an MME. The communication device 140 will be exemplified with a mobile station.

It should be noted that the following embodiments are not mutually exclusive. Components from one embodiment may be tacitly assumed to be present in another embodiment and it will be obvious to a person skilled in the art how those components may be used in the other exemplary embodiments.

Embodiments herein relate to signalling between the communication device 140 and the core network node 115 and to timers related to this signalling. For example, embodiments herein relate to NAS signalling and related NAS timers. As mentioned above, since the values of the NAS timers initiated by the core network node 115 and the NAS timers initiated by the communication device 140 are defined for a communication device in legacy GPRS/EG-PRS operation, they need to be extended for the communication device 140 operating in extended coverage, i.e. for communication devices that are subject to longer signalling delays due to message transmissions over the radio interface having longer latency.

Generally, in embodiments herein the NAS timers in the communication device 140 as well as in the core network node 115 are extended based on a coverage capability of the communication device 140, e.g. by taking the different Coverage Classes into account.

Since EC-GSM-IoT supports different coverage classes in uplink and downlink transmission and the total delay experienced when signalling with the core network will mainly be affected by the worst/highest coverage class regardless if it is in the uplink or downlink, the communication device 140 and/or the core network node 115 may take the coverage class of both directions, uplink and downlink, into account when extending the NAS timers.

Actions for handling extended coverage according to embodiments herein will now be described in relation to FIG. 2 and with continued reference to FIG. 1.

Figure 2:
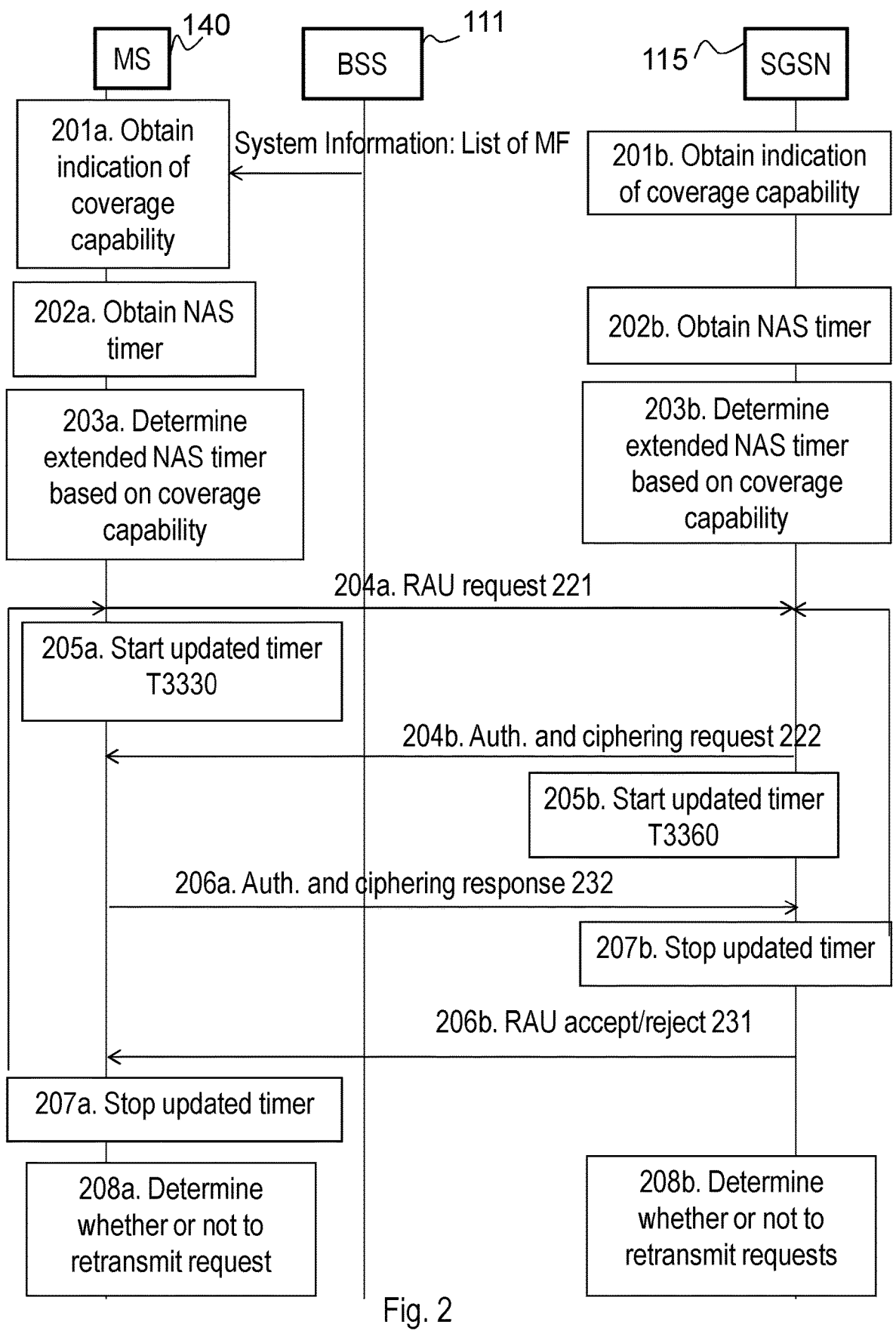
FIG. 2 is a combined signalling diagram and flow chart illustrating embodiments of a method.

FIG. 2 is a combined signalling diagram and flow chart that describes a method for handling extended coverage according to embodiments herein.

Actions 201a-208a are described from the perspective of the communications device 140, while actions 201b-208b are described from the perspective of the core network node 115. Actions with the same numbers are analogous to each other. First actions 201a-208a will be described.

Action 201a

In order for the communication device 140 to make a proper determination of an extended time period in action 203a below, it obtains an indication of its coverage capability. For example, after sending access request, the communication device 140 may receive an assignment message including an, by the network confirmed, uplink and downlink coverage class. The confirmed uplink and downlink coverage class is confirmed in relation to any coverage class indicated by the communication device 140 in the access request. E.g. the communication device 140 may first obtain a coverage class through DL measurements and then assess both a DL and an UL coverage class based on these DL measurements.

The core network node 115 may alter the coverage class compared to the one that the communication device 140 has indicated in the access request.

Action 201*a* is related to action 301 below.

Action 202*a*

The communication device 140 further obtains an indication of a time period, such as a timer value, related to a signalling message 221, 222 between the core network node 115 and the communication device 140. The time period may be used for communication devices that do not operate according to coverage extension.

However, the communication device 140 uses the indication of the time period to determine the extended time period in action 203*a* below.

The signalling message 221, 222 may be a NAS message. For example, the signalling message may be a request message or comprise a request. In FIG. 2 the signalling message 221, 222 is exemplified with a ROUTING AREA UPDATE REQUEST-message.

The indication of the time period may be a timer, such as a NAS timer, or an indication thereof. The indication of the time period may be received in a message from the radio access network node 111 and/or the core network node 115.

E.g. in some embodiments herein the communication device 140 receives the NAS timer from the core network node 115.

Action 202*a* is related to action 302 below.

Action 203*a*

As mentioned above, since the values of the NAS timers are defined for a communication device in legacy operation, they need to be extended for the communication device 140 operating in extended coverage. Therefore, the communication device 140 determines an extended time period, such as an extended timer value, also related to the signalling message 221, 222. The extended time period may also be referred to as an updated time period.

The communication device 140 determines the extended time period based on the indication of the coverage capability of the communication device. The communication device 140 determines the extended time period further based on the obtained time period. The communication device 140 may for example update the obtained time period related to the signalling message 221, 222 based on the indication of the coverage capability of the communication device 140. Thus, the updated time period becomes the extended time period.

In some embodiments, extension of the time period may be achieved by including a list of Multiplicative Factors (MF), e.g. one factor for each Coverage Class, in one of the EC-System Information (EC-SI) messages that is received by the communication device 140, e.g. broadcast on Time Slot (TS) 1. The MFs may be used to multiply the obtained time period, such as the timer value, related to the signalling message 221, 222.

In some other embodiments a single multiplicative factor is used by all communication devices regardless of the confirmed UL and DL coverage classes indicated by the assignment message. In this case the specific value for the single multiplicative factor may either be hard coded, e.g. built into the specifications as a single static value, or sent as part of the system information. In the latter case it is possible to dynamically change the multiplicative factor.

Action 203*a* is related to action 303 below.

Action 204*a*

The communication device 140 may transmit the signalling message 221, 222 related to the extended time period mentioned above. E.g. the signalling message 221, 222 may be a request, such as a ROUTING AREA UPDATE REQUEST.

Action 204*a* is related to action 206*b* below.

Action 205*a*

The communication device 140 may start the timer corresponding to the extended time period when it sends the signalling message 221, 222. The communication device 140 may e.g. start T3330 when sending the RAU Request in action 204*a*.

Action 205*a* is related to action 305 below.

Action 206*a*

As the core network node 115 also transmits messages to the communication device 140, the communication device 140 may transmit a response to a received signalling message 222 from the core network node 115. E.g. the response to the received signalling message 222 may be an AUTHENTICATION AND CIPHERING RESPONSE message or an AUTHENTICATION AND CIPHERING FAILURE message.

As will be described below in action 402*b*, the timing of this response may be important for the core network node 115.

Action 206*a* is related to action 204*b* below.

Action 207*a*

The communication device 140 may in response to a received response to the signalling message 221, 222 stop the timer corresponding to the extended or updated time period.

Action 208*a*

The communication device 140 may determine whether or not the communication device 140 shall retransmit the signalling message 221, 222. E.g. if the extended/updated timer has expired then the communication device 140 may retransmit the signalling message 221, 222. However, if the communication device 140 has already retransmitted the signalling message 221, 222 several times, e.g. so many times as allowed by a threshold value, then the communication device 140 may determine that it shall not retransmit the signalling message 221, 222 anymore.

Action 208*a* is related to action 306 below.

Now actions 201*b*-208*b* will described from the perspective of the core network node 115. For actions 201*b*-208*b* the signalling message 221, 222 will be exemplified with an authentication and ciphering request. In some embodiments there are two signalling messages, a first signalling message 221 and a second signalling message 222.

Action 201*b*

For similar reasons as for the communication device 111, the core network node 115, e.g. the SGSN, obtains the indication of the coverage capability of the communication device 140. That is, in order for the core network node 115 to make a proper determination of an extended time period in action 203*b* below, it obtains an indication of the coverage capability of the communication device 140.

The indication of the coverage capability may be received from e.g. the communication device 140, e.g. at the time of reception of the NAS message such as the RAU request. For example, for the communication device 140 that has set its highest Coverage Class to 3, e.g. by taking both DL and UL Coverage Class into account, the communication device 140 includes the multiplication factor corresponding to CC=3 in e.g. the ROUTING AREA UPDATE REQUEST message.

Action 201*b* is related to action 401 below.

Action 202*b*

The core network node 115 obtains an indication of a time period, such as a timer value, related to a signalling message 221, 222, such as a NAS message, between the core network node 115 and the communication device 140. The core network node 115 uses the indication of the time period to determine the extended time period in action 203*b* below.

The core network node 115 may obtain the indication of the time period from an internal look up table reflecting specified values.

The indication of the time period may be received in a message from the communication device 140.

E.g. in some embodiments herein the core network node 115 receives the NAS timer from the communication device 140.

Action 202*b* is related to actions 402 below.

Action 203*b*

The core network node 115 determines an extended/updated time period, such as an extended timer value, also related to the signalling message 221, 222, based on the indication of the coverage capability of the communication device 140. The core network node 115 may for example update the obtained time period related to the signalling message 221, 222 based on the indication of the coverage capability of the communication device 140. The core network node 115 determines the extended time period further based on the obtained time period.

The core network node 115 may be informed of the multiplication factor valid for the given Coverage Class and the given communication device. For example, in some embodiments, the NAS Request message sent by the communication device 140 may be modified to comprise the selected multiplication factor for the given Coverage Class, e.g. broadcasted in the EC-System information.

The core network node 115 may use the indicated multiplication factor in the ROUTING AREA UPDATE REQUEST message during e.g. the authentication and ciphering procedure when starting a T3360 timer. More specifically, the core network node 115 may use the knowledge of the multiplication factor by multiplying the value of T3360 by the MF. In that way the core network node 115 allows more time for the authentication and ciphering procedure to complete. Since the core network node 115 allows more time for the authentication and ciphering procedure to complete the risk for failure of the procedure is reduced in extended coverage.

Action 203*b* is related to action 403 below.

Action 204*b*

The core network node 115 may transmit the signalling message 221, 222 related to the time period mentioned above. E.g. the signalling message 221, 222 may be a request, such as an authentication and ciphering request.

Action 204*b* is related to action 404 below.

Action 205*b*

The core network node 115 may start a timer corresponding to the extended time period when it sends the signalling message 221, 222. The core network node 115 may e.g. start T3360 when sending the authentication and ciphering request in action 204*b*.

Action 205*b* is related to action 305 below.

Action 206*b*

The core network node 115 may transmit a response to a first signalling message 221 related to the first time period mentioned above. E.g. the response to the first signalling message 221 may be a ROUTING AREA UPDATE ACCEPT or ROUTING AREA UPDATE REJECT message.

Action 206*b* is related to action 204*a* above.

Action 207*b*

The core network node 115 may in response to the received response to the signalling message 221, 222 stop 207 the timer corresponding to the extended/updated time period. The core network node 115 may e.g. stop T3360 at reception of AUTHENTICATION AND CIPHERING RESPONSE in action 206*a*.

Action 208*b*

The core network node 115 may determine whether or not the core network node 115 shall retransmit the signalling message 221, 222. E.g. if the extended/updated timer has expired then the core network node 115 may retransmit the signalling message 221, 222. However, if the core network node 115 has already retransmitted the signalling message 221, 222 several times, e.g. so many times as allowed by a threshold value, then the network node 115 may determine that it shall not retransmit the signalling message 221, 222 anymore.

Action 208*b* is related to action 306 below.

Embodiments relating to extended coverage, and further related to a method performed by the communication device 140 for determining an extended time period related to the signalling message 221 between the core network node 115 and the communication device 140 in the wireless communications network 101, will now be described with reference to a flowchart in FIG. 3.

The signalling message may be the NAS message, such as the RAU request, from the communication device 140 to the core network node 115.

Action 301

The communication device 140 obtains an indication of the coverage capability of the communication device 140.

In some embodiments the indication of the coverage capability is an indication that the communication device 140 operates according to the coverage extension of the Radio Access Technology, RAT.

The indication of the coverage capability may e.g. be an indication that the communication device 140 operates according to any one of EC-GSM-IoT, and NB-IoT.

In some embodiments the indication of the coverage capability is the coverage class of the communication device 140, which coverage class comprises any one or more of an UpLink, UL, coverage class and a Down Link, DL, coverage class.

Action 301 is related to actions 201*a* and 201*b* above and to action 401 below.

Action 302

The communication device 140 obtains an indication of the time period, which time period is related to the signalling message 221. The indication of the time period may for example be the timer value.

Action 302 is related to actions 202*a* and 202*b* above and to action 402 below.

Action 303

The communication device 140 determines the extended time period related to the signalling message 221, based on the indication of the coverage capability of the communication device 140 and based on the indication of the time period.

In that way the communication device 140 allows more time for the NAS procedure to complete when the communication device 140 is in extended coverage, while unnecessary delays of signaling are avoided for the communication device 140 if it is not in extended coverage. Since the communication device 140 allows more time for the NAS procedure to complete when it is in extended coverage, the risk for failure of the procedure is reduced in extended coverage.

In some embodiments determining 203a, 303 the extended time period comprises:

determining the multiplicative factor for multiplying the time period, based on the obtained indication of the coverage capability of the communication device 140; and determining the extended time period based on the multiplicative factor and the obtained indication of the time period.

The multiplicative factor may be determined based on the list of multiplication factors, received e.g. from the radio access network node 111. In some other embodiments the multiplicative factor may be determined based on the coverage capability of the communications device 140 and on the standard of the RAT according to which the communications device 140 operates.

In some embodiments determining the extended time period is based on a single multiplicative factor regardless of the coverage class of the communication device 140. This may for example be the case if the indication of the coverage capability is an indication that the communication device 140 operates according to the coverage extension of the RAT.

In some embodiments determining the extended time period is further based on the highest coverage class out of the UL coverage class and the DL coverage class.

As mentioned above, the timer based on the extended time period may be started when the signalling message 221 is transmitted. Further the timer may be stopped in response to the received response 231 to the signalling message 221.

In some embodiments the multiplicative factor is further based on an amount of data or a number of signals comprising the signalling message 221, that is transmitted between the communication device 140 and the core network node 115 in both uplink and downlink in a time interval defined by a start and a stop of the timer.

Action 303 is related to actions 203a and 203b above and to actions 305 and 403 below.

Action 304

The communication device 140 may transmit the signalling message related to the time period mentioned above. E.g. the signalling message may be a request, such as the ROUTING AREA UPDATE REQUEST.

Action 304 is related to actions 204a and 204b above and to 404 below.

Action 305

The communication device 140 may start the timer corresponding to the extended time period when it sends the signalling message. The communication device 140 may e.g. start T3330 when sending the RAU Request in action 204a.

Action 305 is related to actions 205a and 205b above and to 405 below.

Action 306

The communication device 140 may determine whether or not the communication device 140 shall retransmit the signalling message.

E.g. if the extended/updated timer has expired then the communication device 140 may retransmit the signalling message. However, if the communication device 140 has already retransmitted the signalling message several times, e.g. so many times as allowed by the threshold value, then the communication device 140 may determine that it shall not retransmit the signalling message any more.

Action 306 is related to action 208a above.

Embodiments herein will now be described with reference to FIG. 4a which illustrates a flowchart that describe methods performed by the core network node 115 for handling extended coverage.

In particular FIG. 4a relates to a method performed by the core network node 115 for determining an extended time period related to the signalling message 221, 222 between the core network node 115 and the communication device 140 in the wireless communications network 101.

The signalling message may be a NAS message, such as an authentication and ciphering request 222 from the core network node 115 to the communication device 140.

Action 401

The core network node 115 obtains an indication of the coverage capability of the communication device 140.

In some embodiments the indication of the coverage capability is an indication that the communication device 140 operates according to the coverage extension of the Radio Access Technology, RAT.

The indication of the coverage capability may e.g. be an indication that the communication device 140 operates according to any one of EC-GSM-IoT, and NB-IoT.

In some embodiments the indication of the coverage capability is the coverage class of the communication device 140, which coverage class comprises any one or more of an UpLink, UL, coverage class and the DownLink, DL, coverage class.

The indication of the coverage capability may be received from e.g. the communication device 140. The coverage capability of the communication device 140 may e.g. be received at the time of reception of the NAS message such as the RAU request.

Action 401 is related to action 201b above.

Action 402

The core network node 115 obtains an indication of the time period, which time period is related to the signalling message 221, 222. The indication of the time period may for example be the timer value, such as the NAS timer, or an indication thereof. The indication of the time period may be received in the message from the communication device 140, such as the NAS request.

Action 402 is related to action 202b above.

Action 403

The core network node 115 determines the extended time period, such as an extended timer value, related to the signalling message 221, 222, based on the indication of the coverage capability of the communication device 140 and based on the indication of the time period. The core network node 115 may for example update the obtained time period related to the signalling message based on the indication of the coverage capability of the communication device 140.

In some embodiments determining the extended time period comprises:

determining the multiplicative factor for multiplying the time period, based on the obtained indication of the coverage capability of the communication device 140; and determining the extended time period based on the multiplicative factor and the obtained indication of the time period.

In some embodiments determining the extended time period is based on the single multiplicative factor regardless of the coverage class of the communication device 140. This may for example be the case if the indication of the coverage capability is an indication that the communication device 140 operates according to the coverage extension of the RAT.

In some embodiments determining the extended time period is further based on the highest coverage class out of the UL coverage class and the DL coverage class.

As mentioned above, a timer based on the extended time period may be started when the signalling message 221, 222 is transmitted. Further the timer may be stopped in response to the received response 231 to the signalling message 221, 222.

In some embodiments the multiplicative factor is further based on an amount of data or a number of signals comprising the signalling message 221, 222, that is transmitted between the communication device 140 and the core network node 115 in both uplink and downlink in the time interval defined by the start and the stop of the timer.

In yet some other embodiments, the core network node 115 determines the multiplicative factor based on the DL Coverage Class reported by the communication device 140, and the output power capability of the communication device 140.

The DL Coverage Class reported by the communication device 140 may be included in an UL-UNITDATA PDU-message received from the radio access network node 111 as defined in 3GPP TS 48.018, while the output power capability may be comprised in e.g. an MS Radio Access Capability IE, as defined in 3GPP TS 24.008 V13.3.0.

In this case no UL Coverage Class information need to be included in the UL-UNITDATA PDU sent from the radio access network node 111.

Action 403 is related to action 203b above and to actions 404 and 405 below.

Action 404

The core network node 115 may transmit the signalling message related to the time period mentioned above. E.g. the signalling message may be a request, such as the authentication and ciphering request.

Action 404 is related to action 204b above.

Action 405

The core network node 115 may start the timer corresponding to the extended time period when it sends the signalling message. The core network node 115 may e.g. start T3360 when sending the authentication and ciphering request.

Action 405 is related to action 205b above.

Action 406

The core network node 115 may determine whether or not the core network node 115 shall retransmit the signalling message.

E.g. if the extended/updated timer has expired then the core network node 115 may retransmit the signalling message. However, if the core network node 115 has already retransmitted the signalling message several times, e.g. so many times as allowed by the threshold value, then the core network node 115 may determine that it shall not retransmit the signalling message any more.

Action 406 is related to action 208b above.

Some optional embodiments will now be described from the perspective of the core network node 115 with reference to a flowchart depicted in FIG. 4b.

If the core network node 115 has knowledge of the timer value used by the communication device 140 for the routing area updating procedure, e.g. the T3330 timer, then the core network node 115 may use the multiplication factor received in the ROUTING AREA UPDATE REQUEST message to estimate how much remaining time it has available for completing any additional intermediate NAS level signalling, such as the authentication and ciphering procedure, prior to sending the ROUTING AREA UPDATE ACCEPT message back to the communication device 140.

If the remaining time it has available is not considered to be sufficient for completing any given optional intermediate NAS signalling procedures then the core network node 115 may choose to not perform those procedures in the interest of ensuring that it may send the ROUTING AREA UPDATE ACCEPT message back to the communication device 140 prior to the communication device 140 declaring a timeout condition for the RA updating procedure.

The risk for failure of the RA updating procedure is thus reduced in extended coverage since the core network node 115 determines to not perform the authentication and ciphering procedure before sending the ROUTING AREA UPDATE ACCEPT in the event that the remaining time it has available is not sufficient for completing the authentication and ciphering procedure.

Actions 401b

Thus, according to the above, in some embodiments the core network node 115 determines the first extended time period related to the first signalling message 221 from the communications device 140.

Action 402b

Then the core network node 115 determines to transmit the second signalling message 222 to the communication device 140 if the first extended time period is sufficient for completing the transmission of the second signalling message 222 to the communication device 140 and the reception of the response 232 from the communication device 140 to the second signalling message 222, prior to sending the response 231 to the first signalling message 221 to the communication device 140.

Further Embodiments

The list of multiplicative factors may e.g. comprise of a set of four 2 bit values, one 2 bit value for each Coverage Class as exemplified below:

| Coverage Class | MF value broadcast in SI | Multiplicative factor |
| --- | --- | --- |
| 1 | 00 | 1 |
| 2 | 01 | 2 |
| 3 | 10 | 3 |
| 4 | 11 | 4 |

Thus the communication device 140 that has determined its UL Coverage Class to 3 and its DL coverage class to 2 may multiply its legacy NAS timer value, as defined in 3GPP TS 24.008 V13.3.0, with a factor 3 to reflect the highest experienced coverage class. The communication device 140 with the highest coverage class set to 3 may then calculate its T3330 value to 45 seconds (3*15) when sending the ROUTING AREA UPDATE REQUEST message to the core network node 115.

In some second embodiments, the communication device 140 calculates a new NAS timer value in action 303, based only on the confirmed DL Coverage Class, i.e. without considering the UL Coverage Class. The communication device 140 that has confirmed its DL Coverage Class to 2 may then calculate its T3330 value to 30 seconds (2*15) when sending the ROUTING AREA UPDATE REQUEST message to the core network node 115.

In yet some other embodiments, the communication device 140 calculates the new NAS timer value in action 303, based only on the confirmed UL Coverage Class, i.e. without considering the DL Coverage Class. The communication device 140 that has confirmed its UL Coverage Class to 3 may then calculate its T3330 value to 45 seconds (3*15) when sending the ROUTING AREA UPDATE REQUEST message to the core network node 115.

As an optional extension to the embodiments above, the NAS timer values may be calculated with coverage class dependent multiplicative factor(s) multiplied with a common multiplicative factor, i.e. common for all Coverage Classes. The coverage class dependent multiplicative factor may be pre-defined. The common multiplicative factor may e.g. be broadcasted in the EC-system information. This allows the core network node 115 some control of the NAS related timers. As an example, if the coverage class dependent multiplicative factors are defined as below:

| Coverage Class | CC dependent MF |
| --- | --- |
| 1 | 1 |
| 2 | 2 |
| 3 | 3 |
| 4 | 4 |

Then the common multiplicative factor may for example be set to a value of 2, which will result in the following time intervals for a legacy timer value of 15 seconds:

| Coverage Class | CC dependent timer value (CC dependent MF * common MF) |
| --- | --- |
| 1 | 1 × 2 × 15 = 30 sec |
| 2 | 2 × 2 × 15 = 60 sec |
| 3 | 3 × 2 × 15 = 90 sec |
| 4 | 4 × 2 × 15 = 120 sec |

The number of bits to use when broadcasting the multiplicative factors as well as the multiplicative factors themselves are just examples. The multiplicative factors may depend on the specific Radio Access Technology, e.g. EC-GSM-IoT or NB-IoT. The multiplicative factors may further depend on the number of supported Coverage Classes in the system. The number of supported Coverage Classes may be different from four as exemplified above. The multiplicative factors may yet further depend on the specific core network NAS protocol, e.g. 3GPP TS 24.008 V13.3.0 or 3GPP TS 24.301 v13.3.0.

In some other embodiments related to actions 201b and 401 above, the communication device 140 reports a calculated DL coverage class to the radio access network node 111 whenever accessing the network, e.g. for the purpose of performing a RAU. The calculated DL coverage class may have been determined by the communication device 140 by measuring on DL transmissions in a cell.

The radio access network node 111 then processes the calculated DL coverage class to arrive at a confirmed DL coverage class. The calculated DL coverage class is provided by the communication device 140 to the radio access network node 111 as part of the access attempt sent on a Random Access Channel (RACH). The radio access network node 111 is the master and is therefore free to override the value provided by the communication device 140 in favor of a safer one, e.g. one level higher, in the interest of caution. As such, whatever value the radio access network node 111 decides shall be used becomes the confirmed DL coverage class.

As an example of actions 201b and 401, the core network node 115 then receives the confirmed DL Coverage Class of the communication device 140 from the radio access network node 111 in the UL-UNITDATA PDU. The communication device 140 may inform the core network node 115 whenever a degradation of the DL Coverage Class is experienced, e.g. using a Cell Update procedure.

A degradation of the DL coverage class may be necessary if the radio coverage of the communication device 140 changes for some reason, e.g. due to that the communication device 140 is moving, or if there are changes in the surrounding radio environment. As a result of this, the core network node 115 will always be updated with the latest Coverage Class information for all EC-GSM-IoT capable communication devices located within the Routing Area.

The knowledge of the confirmed DL Coverage Class for a given communication device 140 may be used when calculating the NAS timer value in action 403 in the core network node 115, e.g. when starting the T3360 during the authentication and ciphering procedure. If the communication device 140 has e.g. reported DL CC=2 in its initial access to the radio access network node 111, which is further sent to core network node 115 in the UL-UNITDATA PDU, then the multiplicative factor of 2 may be applied in the core network node 115 resulting in the T3360 timeout value of 12 seconds.

In yet some other embodiments also related to actions 201b and 401 above, the radio access network node 111 also includes the UL Coverage Class of the communication device 140 in the UL-UNITDATA PDU. I.e. both the UL and the DL Coverage Class is included in the UL-UNITDATA PDU. As an option the radio access network node 111 only includes the UL Coverage Class in the UL-UNITDATA PDU if the UL CC differs from the DL CC.

The radio access network node 111 is expected to take the UL coverage class it determined was applicable to the communication device 140 when managing its access attempt on the RACH, and relay it to the core network node 115.

The communication device 140 may inform the network whenever a degradation of the DL Coverage Class is experienced. For example, the core network node 115 may be informed via the radio access network node 111 relaying a new DL coverage class received from the communication device 140, e.g. using a Cell Update procedure. As mentioned above, the new coverage class may be included in the UL-UNITDATA PDU. In the same way the radio access network node 111 may inform the core network node 115 whenever the UL Coverage Class of the communication device 140 is degraded.

The knowledge of the DL and UL Coverage Class for a given communication device 140 may be used when calculating the NAS timer value in the core network node 115 in action 403, e.g. when starting the T3360 during the authentication and ciphering procedure. If e.g. the DL CC of the communication device 140 is set to 1 and the UL CC is set to 2, then the multiplicative factor of 2 may be applied in the core network node 115 resulting in the T3360 timeout value of 12 seconds. This corresponds to determining the timer based on the highest coverage class.

In some further embodiments, the EC-System information need not include coverage class specific multiplicative factors in which case both the communication device 140 and the core network node 115 may use pre-determined multiplicative factors in actions 303 and 403. The pre-determined multiplicative factors may be explicitly indicated by the technical specifications for a certain communication standard, e.g. hard coded multiplicative factors.

For example, the communication device 140 may map the uplink and downlink coverage class information comprised within a resource assignment message, e.g. sent on the Extended Coverage Access Grant CHannel (EC-AGCH) to a specific multiplicative factor as pre-determined by the specifications.

Similarly, the downlink coverage class information, and optionally the uplink coverage class information provided to the core network node 115 in an UL-UNITADATA PDU may be mapped to the specific multiplicative factor as pre-determined by the specifications.

The core network node 115 may then apply the specific multiplicative factor when starting the NAS timer, e.g. in the authentication and ciphering procedure.

In yet some further embodiments related to actions 203a, 203b, 303 and 403, the NAS timer values in the communication device 140 and in the network, such as in the core network node 115, may be set based on the confirmed DL and UL Coverage Classes for the communication device 140. The multiplicative factors to use may be calculated per direction, i.e. one multiplicative factor for DL CC and one for UL CC. Different Coverage Classes may be used in the two directions, and then combined into the single multiplicative factor for determining the NAS timer values to use.

E.g. instead of taking the highest of the UL and DL coverage class as the multiplicative factor the core network node 115 may use an average of the multiplicative factors= [MF(UL CC)+MF(DL CC)]/2. Different multiplicative factor values, per Coverage Class and direction, DL and UL, may then be sent in the EC-System Information messages broadcast on TS 1.

An advantage of using the average of the multiplicative factors is that the timer may be set to a lower value compared to using the highest multiplicative factor, which reduces delays. The lower value takes the coverage extension in the two used directions into account, i.e. it gives an estimation of the total used coverage extension for the communication device 140.

In yet some further embodiments related to action 203a, 203b, 303 and 403, the multiplicative factor to use for the specific NAS timer may be based on the amount of data or, as an option, the number of signals that needs to be sent between the communication device 140 and the network, such as the core network node 115, in each direction, uplink and downlink, before the NAS procedure is completed and thus the NAS timer is stopped. For procedures that may trigger optional procedures and thus additional signalling, the option that requires most signalling may be considered in the calculation of the NAS timer value.

By further taking into account the amount of data or the number of signals when calculating the timers, the risk for failure is further reduced, while unnecessary delay is avoided.

The multiplicative factors derived using any of embodiments above are all examples of where the communication device 140 and the core network node 115 implementations depend on the specifications for informing them how to determine coverage class specific multiplicative factors.

However, in some other embodiments it may also be possible for both the communication device 140 and the core network node 115 to identify coverage class specific multiplicative factor in an implementation specific manner.

For example, the communication device 140 may map the uplink and downlink coverage class information included within the resource assignment message, e.g. sent on the EC-AGCH, to the specific multiplicative factor based on an implementation of the communication device 140. Similarly, the downlink coverage class information, and possibly also the uplink coverage class information, provided to the core network node 115 in an UL-UNITADATA PDU may be mapped to the specific multiplicative factor based on an implementation of the core network node 115.

Regardless of how the multiplicative factors are determined, e.g. specification driven or implementation based, they may also depend on the applicable Radio Access Technology, e.g. EC-GSM-IoT, or NB-IoT. Further, the multiplicative factors may also depend on the number of coverage classes supported by the system, i.e. the number of supported coverage classes may be different from the four presumed for EC-GSM as exemplified herein. The multiplicative factors may also depend on the specific core network NAS protocol, e.g. 3GPP TS 24.008 v13.3.0 or 3GPP TS 24.301 v13.3.0.

The procedures and timers described herein are just examples. There are other procedures and timers defined in 3GPP TS 24.008 V13.3.0 affected by the signalling latency due to communication devices operating in extended coverage. One example is the Authentication procedure wherein the AUTHENTICATION REQUEST message is sent across the radio interface to the communication device 140 and the network starts the timer T3260.

Other examples are:

T3310 started at sending of Attach Request from the communication device 140.

T3321 started at sending of Detach Request from the communication device 140.

T3322 started at sending of Detach Request from the core network node 115.

T3350 started at sending of Attach Accept or RAU Accept or P-TMSI Reallocation Command from the core network node 115.

T3370 started at sending of Identity Request from the core network node 115.

Advantages of Embodiments Herein

The NAS timers in the communication device 140 and the core network node 115 may be adjusted according to the uplink coverage class of the communication device 140, the downlink coverage class of the communication device 140, the highest of the uplink and downlink coverage class of the communication device 140 either (a) as determined by the specifications or (b) as determined by the communication device 140 and the core network node 115 in an implementation specific manner. By doing so the communication device 140 and the core network node 115 take into account the increased signalling delay experienced over the radio interface when the communication device 140 is operating in extended coverage.

By doing so the communication device 140 and the core network node 115 avoids timeouts. For battery limited wireless devices, which may be the case for the communication device 140, this is critical since each timeout means it will try again and waste more battery.

For the case where system information is used to determine the multiplication factor to associate with a given downlink or uplink coverage class, the NAS timers in the communication device 140 and the core network node 115 may be adjusted over time. Further, the NAS timers in the communication device 140 may be adjusted and tuned on a per cell basis. Thus, those embodiments make the determination of the extended time period more flexible, and the risk for time outs due to changes in data traffic is reduced, while unnecessary delays in the signalling is avoided.

The method for determining the extended time period described above may be performed by the communication device 140. The communication device 140 may comprise the modules depicted in FIG. 5 for determining the extended time period.

The communication device 140 is configured to, e.g. by means of an obtaining module 510 configured to, obtain an indication of the coverage capability of the communication device 140.

Thus action 301 may be performed by means such as the obtaining module 510 in the communication device 140. The obtaining module 510 may be implemented, at least in part, by a processor 580 in the communication device 140, optionally in combination with a receiver 560*b*, in the communication device 140.

The communication device 140 is further configured to, e.g. by means of the obtaining module 510 configured to, obtain an indication of the time period, which time period is related to the signalling message 221.

Thus action 302 may be performed by means such as the obtaining module 510 in the communication device 140.

The communication device 140 is further configured to, e.g. by means of a determining module 520 configured to, determine the extended time period related to the signalling message 221, based on the indication of the coverage capability of the communication device 140 and based on the indication of the time period.

The communication device 140 may be configured to, e.g. by means of the determining module 520 configured to, determine the extended time period by being configured to:

determine the multiplicative factor for multiplying the time period, based on the obtained indication of the coverage capability of the communication device 140; and determine the extended time period based on the multiplicative factor and the obtained indication of the time period.

In some embodiments the communication device 140 is configured to, e.g. by means of the determining module 520 configured to, determine the extended time period based on the single multiplicative factor regardless of the coverage class of the communication device 140.

The communication device 140 may further be configured to, e.g. by means of the determining module 520 configured to, determine the extended time period further based on the highest coverage class out of the UL coverage class and the DL coverage class.

In some further embodiments the communication device 140 is configured to start the timer based on the extended time period when the signalling message 221 is transmitted, and configured to stop the timer in response to the received response 231 to the signalling message 221. In those embodiments the multiplicative factor may further be based on an amount of data or the number of signals comprising the signalling message 221, that is transmitted between the communication device 140 and the core network node 115 in both uplink and downlink in the time interval defined by the start and the stop of the timer.

Thus action 303 may be performed by means such as the determining module 520 in the communication device 140. The determining module 520 may be implemented, at least in part, by the processor 580 in the communication device 140.

Action 304 of transmitting the signalling message 221 may be performed by means such as a transmitting module 530*a* in the communication device 140. The transmitting module 530 may be implemented by the processor 580, optionally in combination with a transmitter 560*a*, in the communication device 140.

Further, action 305 of starting the timer may be performed by means such as a timer module 540 in the communication device 140. The timer module 540 may be implemented by the processor 580.

The action of receiving the response to the signalling message 221 may be performed by means such as a receiving module 530*b* in the communication device 140. The receiving module 530*b* may be implemented by the processor 580, optionally in combination with the receiver 560*b*, in the communication device 140.

The method for determining the extended time period described above may be performed by the core network node 115. The core network node 115 may comprise the modules depicted in FIG. 6 for determining the extended time period.

The core network node 115 is configured to, e.g. by means of the obtaining module 610 configured to, obtain an indication of the coverage capability of the communication device 140.

Thus action 401 may be performed by means such as the obtaining module 610 in the core network node 115. The obtaining module 610 may be implemented, at least in part, by a processor 680 in the core network node 115, optionally in combination with a receiver 660*b*, in the core network node 115.

The core network node 115 is further configured to, e.g. by means of the obtaining module 610 configured to, obtain an indication of the time period, which time period is related to the signalling message 221, 222.

Thus action 402 may be performed by means such as the obtaining module 610 in the core network node 115.

The core network node 115 is further configured to, e.g. by means of a determining module 620 configured to, determine the extended time period related to the signalling message 221, 222, based on the indication of the coverage capability of the communication device 140 and based on the indication of the time period.

The core network node 115 may be configured to, e.g. by means of the determining module 620 configured to, determine the extended time period by being configured to:

determine the multiplicative factor for multiplying the time period, based on the obtained indication of the coverage capability of the communication device 140; and determine the extended time period based on the multiplicative factor and the obtained indication of the time period.

In some embodiments the core network node 115 is configured to, e.g. by means of the determining module 620 configured to, determine the extended time period based on the single multiplicative factor regardless of the coverage class of the communication device 140.

The core network node 115 may further be configured to, e.g. by means of the determining module 620 configured to, determine the extended time period further based on the highest coverage class out of the UL coverage class and the DL coverage class.

In some further embodiments the core network node 115 is configured to start the timer based on the extended time period when the signalling message 221, 222 is transmitted, and configured to stop the timer in response to the received response 231 to the signalling message 221, 222. In those embodiments the multiplicative factor may further be based on an amount of data or the number of signals comprising the signalling message 221, 222, that is transmitted between the communication device 140 and the core network node 115 in both uplink and downlink in the time interval defined by the start and the stop of the timer.

In yet some further embodiments the core network node 115 is configured to determine the first extended time period related to the first signalling message 221, 222 from the communications device 140. Then the core network node 115 is further configured to determine to transmit the second signalling message 222 to the communication device 140 if the first extended time period is sufficient for completing the transmission of the second signalling message 222 to the communication device 140 and the reception of the response 232 from the communication device 140 to the second signalling message 222, prior to sending the response 231 to the first signalling message 221, 222 to the communication device 140.

Thus action 403 may be performed by means such as the determining module 620 in the core network node 115. The determining module 620 may be implemented, at least in part, by the processor 680 in the core network node 115.

Action 404 of transmitting the signalling message 221, 222 may be performed by means such as a transmitting module 630a in the core network node 115. The transmitting module 630 may be implemented by the processor 680, optionally in combination with a transmitter 660a, in the core network node 115.

Further, action 405 of starting the timer may be performed by means such as a timer module 640 in the core network node 115. The timer module 640 may be implemented by the processor 580.

The action of receiving the response to the signalling message 221, 222 may be performed by means such as a receiving module 630b in the core network node 115. The receiving module 630b may be implemented by the processor 680, optionally in combination with the receiver 660b, in the core network node 115.

Figure 5:
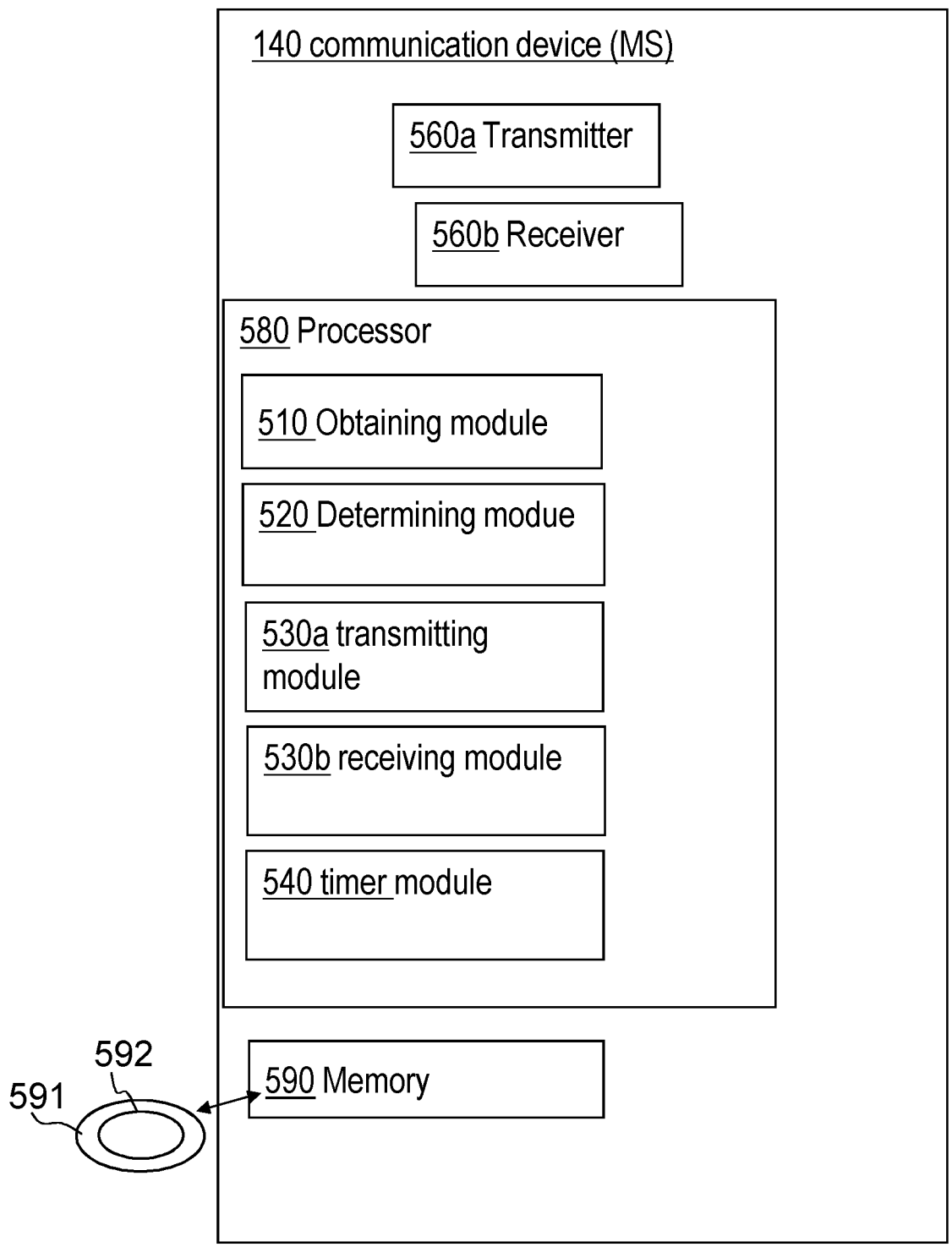
FIG. 5 is a schematic block diagram illustrating embodiments of a communication device.
Figure 6:
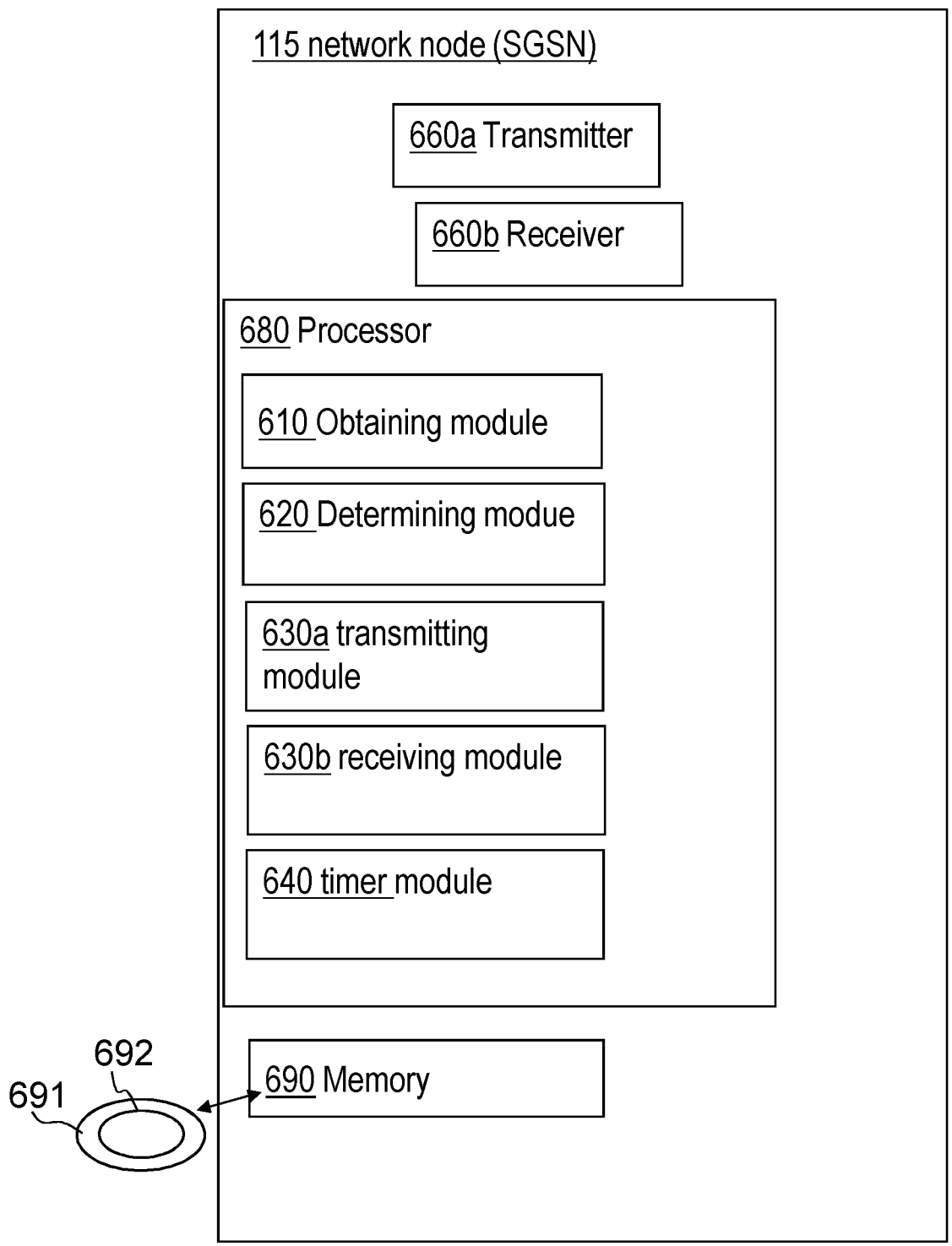
FIG. 6 is a schematic block diagram illustrating embodiments of a network node.

The embodiments herein may be implemented through one or more processors, such as the processor 580 in the communication device 140 depicted in FIG. 5, and the processor 680 in the core network node 115 depicted in FIG. 6 together with computer program code for performing the functions and actions of the embodiments herein. The program code mentioned above may also be provided as a computer program product, for instance in the form of a data carrier 591, 691 carrying computer program code 592, 692 for performing the embodiments herein when being loaded into the communication device 140 and the core network node 115. One such carrier may be in the form of a CD ROM disc. It is however feasible with other data carriers such as a memory stick. The computer program code may furthermore be provided as pure program code on a server and downloaded to the communication device 140 and core network node 115.

Thus, the methods according to the embodiments described herein for the communication device 140 and the core network node 115 may be implemented by means of a computer program product, comprising instructions, i.e., software code portions, which, when executed on at least one processor, cause the at least one processor to carry out the actions described herein, as performed by the communication device 140 and the core network node 115. The computer program product may be stored on a computer-readable storage medium. The computer-readable storage medium, having stored there on the computer program, may comprise the instructions which, when executed on at least one processor, cause the at least one processor to carry out the actions described herein, as performed by the communication device 140 and the core network node 115. In some embodiments, the computer-readable storage medium may be a non-transitory computer-readable storage medium.

The communication device 140 and the core network node 115 may further each comprise a memory 590, 690, comprising one or more memory units. The memory 590, 690 is arranged to be used to store obtained information such as coverage capability, coverage class, multiplicative factors, time periods, such as timers, extended timers and applications etc. to perform the methods herein when being executed in the communication device 140 and the core network node 115.

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Note that although terminology from 3GPP EC-GSM has been used in this disclosure to exemplify the embodiments herein, this should not be seen as limiting the scope of the embodiments herein to only the aforementioned network types. Other wireless network types may also benefit from exploiting the ideas covered within this disclosure.

Also note that terminology such as a first radio access network node and a second radio access network node should be considered to be non-limiting and does in particular not imply a certain hierarchical relation between the two.

The invention claimed is:

1. A method performed by a communication device for determining an extended time period related to a signaling message between a core network node and the communication device in a wireless communications network, the method comprising:
   obtaining an indication of a coverage capability of the communication device, wherein the indication of the coverage capability is an indication that the communication device operates according to a coverage extension of a Radio Access Technology (RAT);
   obtaining an indication of a time period, which time period is related to the signaling message;
   determining the extended time period related to the signaling message, based on the indication of the coverage capability of the communication device and based on the indication of the time period, wherein determining the extended time period comprises determining a multiplicative factor for multiplying the time period, based on the obtained indication of the coverage capability of the communication device, and determining the extended time period based on the multiplicative factor and the obtained indication of the time period; and starting a timer based on the extended time period when the signaling message is transmitted and stopping the timer in response to a received response to the signaling message;

wherein the multiplicative factor is further based on an amount of data or a number of signals, comprising the signaling message, transmitted between the communication device and the core network node in both uplink and downlink in a time interval defined by a start and a stop of the timer.

2. The method of claim 1, wherein the indication of the coverage capability is an indication that the communication device operates according to any one of Extended-Coverage Global System for Mobile communications Internet of Things (EC-GSM-IoT) and Narrow Band Internet of Things (NB-IoT).

3. A communication device configured to determine an extended time period related to a signaling message between a core network node and the communication device in a wireless communications network, the communication device comprising a processing circuit and a memory operatively coupled to the processing circuit and comprising program instructions for execution by the processing circuit, whereby the communication device is configured to:
  obtain an indication of a coverage capability of the communication device, wherein the indication of the coverage capability is an indication that the communication device operates according to a coverage extension of a Radio Access Technology (RAT);
  obtain an indication of a time period, which time period is related to the signaling message;
  determine the extended time period related to the signaling message, based on the indication of the coverage capability of the communication device and based on the indication of the time period, by determining a multiplicative factor for multiplying the time period, based on the obtained indication of the coverage capability of the communication device, and determining the extended time period based on the multiplicative factor and the obtained indication of the time period;
  start a timer based on the extended time period when the signaling message is transmitted; and
  stop the timer in response to a received response to the signaling message,
wherein the multiplicative factor is further based on an amount of data or a number of signals, comprising the signaling message, transmitted between the communication device and the core network node in both uplink and downlink in a time interval defined by a start and a stop of the timer.

4. The communication device of claim 3, wherein the indication of the coverage capability is an indication that the communication device operates according to a coverage extension of a Radio Access Technology (RAT).

5. The communication device of claim 4, wherein the indication of the coverage capability is an indication that the communication device operates according to any one of Extended-Coverage Global System for Mobile communications Internet of Things (EC-GSM-IoT) and Narrow Band Internet of Things (NB-IoT).

6. A method performed by a core network node for determining an extended time period related to a signaling message between a core network node and the communication device in a wireless communications network, the method comprising:
  obtaining an indication of a coverage capability of the communication device, wherein the indication of the coverage capability is an indication that the communication device operates according to a coverage extension of a Radio Access Technology (RAT);
  obtaining an indication of a time period, which time period is related to the signaling message;
  determining the extended time period related to the signaling message, based on the indication of the coverage capability of the communication device and based on the indication of the time period;
  starting a timer based on the extended time period when the signaling message is transmitted; and
  stopping the timer in response to a received response to the signaling message,
wherein the multiplicative factor is further based on an amount of data or a number of signals, comprising the signaling message, transmitted between the communication device and the core network node in both uplink and downlink in a time interval defined by a start and a stop of the timer.

7. The method of claim 6, wherein the indication of the coverage capability is an indication that the communication device operates according to any one of Extended-Coverage Global System for Mobile communications Internet of Things (EC-GSM-IoT) and Narrow Band Internet of Things (NB-IoT).

8. A core network node configured to determine an extended time period related to a signaling message between a core network node and the communication device in a wireless communications network, the core network node comprising a processing circuit and a memory operatively coupled to the processing circuit and comprising program instructions for execution by the processing circuit, whereby the core network node is configured to:
  obtain an indication of a coverage capability of the communication device;
  obtain an indication of a time period, which time period is related to the signaling message; and
  determine the extended time period related to the signaling message, based on the indication of the coverage capability of the communication device and based on the indication of the time period, by determining a multiplicative factor for multiplying the time period, based on the obtained indication of the coverage capability of the communication device, and determining the extended time period based on the multiplicative factor and the obtained indication of the time period.

9. The core network node of claim 8, wherein the indication of the coverage capability is an indication that the communication device operates according to a coverage extension of a Radio Access Technology (RAT).

10. The core network node of claim 9, wherein the indication of the coverage capability is an indication that the communication device operates according to any one of Extended-Coverage Global System for Mobile communications Internet of Things (EC-GSM-IoT) and Narrow Band Internet of Things (NB-IoT).

11. The core network node of claim 8, wherein the core network node is further configured to start a timer based on the extended time period when the signaling message is transmitted, and configured to stop the timer in response to a received response to the signaling message, and wherein the multiplicative factor is further based on an amount of data or a number of signals comprising the signaling message, that is transmitted between the communication device and the core network node in both uplink and downlink in a time interval defined by the start and the stop of the timer.

* * * * *